US007661352B2

(12) United States Patent
Sher et al.

(10) Patent No.: US 7,661,352 B2
(45) Date of Patent: Feb. 16, 2010

(54) METHOD AND SYSTEM FOR IN-CUP DISPENSING, MIXING AND FOAMING HOT AND COLD BEVERAGES FROM LIQUID CONCENTRATES

(75) Inventors: Alexander A. Sher, Danbury, CT (US); Derrick Abilay Bautista, New Fairfield, CT (US); Simon J. Livings, New Milford, CT (US); Larry Bartoletti, Northfield, CT (US); Randall C. Chrisman, Southbury, CT (US)

(73) Assignee: Nestec S.A., Vevey (CH)

( * ) Notice: Subject to any disclaimer, the term of this patent is extended or adjusted under 35 U.S.C. 154(b) by 434 days.

(21) Appl. No.: 10/930,663

(22) Filed: Aug. 31, 2004

(65) Prior Publication Data

US 2006/0045942 A1 Mar. 2, 2006

(51) Int. Cl.
*A47J 31/40* (2006.01)
*B67D 5/56* (2006.01)

(52) U.S. Cl. .............................. 99/275; 99/287; 99/300; 99/323.1; 222/129.1; 222/145.5; 222/145.6; 222/214

(58) Field of Classification Search ................... 99/275, 99/300, 323.1, 287; 222/129.1, 145.5, 146.6, 222/214; 366/165.1, 165.2, 137.1
See application file for complete search history.

(56) References Cited

U.S. PATENT DOCUMENTS

| | | | | |
|---|---|---|---|---|
| 3,986,642 | A | 10/1976 | Selvia et al. | |
| 4,676,401 | A | 6/1987 | Fax et al. | 222/1 |
| 5,000,357 | A | 3/1991 | Shannon et al. | |
| 5,875,930 | A | 3/1999 | Nakajima et al. | |
| 6,142,340 | A * | 11/2000 | Watanabe et al. | 222/66 |
| 6,305,269 | B1 | 10/2001 | Stratton | 99/323.1 |
| 7,226,631 | B2 * | 6/2007 | Thakur et al. | 426/477 |

FOREIGN PATENT DOCUMENTS

| | | | |
|---|---|---|---|
| EP | 0373126 | | 6/1990 |
| EP | 1 088 504 | A1 | 4/2001 |
| EP | 1 348 364 | A1 | 10/2003 |
| GB | 1367354 | | 9/1974 |
| JP | 03240194 | * | 3/1991 |
| WO | WO02/081356 | | 10/2002 |

* cited by examiner

*Primary Examiner*—Reginald L Alexander
(74) *Attorney, Agent, or Firm*—K&L Gates LLP

(57) ABSTRACT

Liquid food dispensing device (1) for dispensing hot or cold beverages or other liquid foods without using any mixing or whipping chambers comprising at least one liquid component source (30, 31) and a diluent source (18), a delivery device and at least one diluent nozzle and one food component nozzle wherein the delivery device and diluent and food component nozzles are configured for ejecting at least one stream (6*a*, 6*b*) of diluent at a predetermined spatial configuration inside a container (10) and within a velocity range effective to create turbulence and mix the food component so to produce the food product such as the hot or cold beverage.

25 Claims, 4 Drawing Sheets

METHOD AND SYSTEM FOR IN-CUP DISPENSING, MIXING AND FOAMING HOT AND COLD BEVERAGES FROM LIQUID CONCENTRATES

FIELD OF THE INVENTION

The present invention relates generally to a liquid food dispensing apparatus. More particularly the invention concerns a dispenser system and a method for dispensing hot or cold beverages or the like reconstituted from liquid concentrates which does not use any mixing or whipping chambers.

BACKGROUND OF THE INVENTION

Conventional hot or cold beverage dispensing systems are widely used in offices, convenience stores, restaurants, homes, etc.

One type of widely used beverage dispenser system uses an impeller, such as blades, disc, etc., driven in rotation by an electric motor that mixes powder such as coffee or tea powder or syrup with a hot or cold liquid such as liquid in a whipping bowl or chamber before being dispensed in a cup. A system of this type is described for example in U.S. Pat. No. 4,676,401.

Systems of this type are sometimes expensive and cumbersome as a space is required for a mixing bowl or whipper-chamber and impeller engine. Further, in order to avoid hygienic issues, due to residual product left in the whipper-chamber and/or on the impeller, these systems require certain maintenance and periodic cleanings. Moreover, when using powders, precipitation of non-dissolved powder particles as well as stratification of liquids in a cup after dispensing may occur, especially at ambient temperature. "Stratification" in this usage refers to the amount of heterogeneity at different levels in the liquid part of the product.

Another type of system for producing and dispensing whipped soft drinks, such as hot chocolate and beverages, without using a mechanical whipping mechanism, such as rotating blades, has been proposed in U.S. Pat. No. 6,305,269. In this system, the whipping of the mixture of syrup and water used to produce the beverage is achieved by intermixing, within a vented mixing chamber, intersecting streams of syrup and water that are directed toward an intersection point under pressure. Even though this system eliminates the use of an impeller in the mixing chamber, the wall of the mixing chamber after it has been used becomes quickly soiled by residues so the hygiene is still an issue and periodical cleaning of the mixing chamber is still required. As the cleaning operations often require the mixing chamber to be removed they are labor-intensive and costly. Moreover, it has been shown that the foam obtained with this system using one water jet and one concentrate jet typically had a soapy appearance with large bubble size, and stability was extremely poor.

Other dispensing systems use in-cup mixing of dry beverage powder with a jet of water directed to a cup to mix with the powder and to produce foam, as for instance, EP 1088504 A or EP 1 348 364 A1, but there are several disadvantages to these existing systems which are: 1) In-cup mixing of dry powder provides insufficient mixing with certain food components, such a milk powder, 2) In cup mixing of powder does not properly deliver homogeneous cold beverage as certain powders do not dissolve well with a non-heated diluent, 3) The existing devices have too large a footprint for accommodating the powder storage, 4) The existing devices are usually complex and costly with systems to move the cup from the storage area to the mixing area, 5) Some existing devices also provide splashing during mixing as to their particular jet configuration which can create hygienic and/or cleaning issues.

An improved system is needed that is better suited for producing both foamed and non-foamed products, without stratification issues, in a more hygienic manner, while eliminating the need for cleaning in place (CIP) devices, reducing product contamination and also reducing the mechanical complexity of known dispensers. More particularly, a system is needed for foamed beverage, such as cappuccino-type beverages, with an optimal foam layer, and that preferably can reduce cleaning and maintenance.

SUMMARY OF THE INVENTION

The invention relates to a food product dispenser. A preferred embodiment of the dispenser has a diluent source, at least one diluent nozzle, at least one food component source in a liquid form, at least one food component nozzle, and a delivery device. The delivery device connects the diluent source to the diluent nozzle and the component source to the food component nozzle. The delivery device and nozzles are preferably configured such that the diluent and food component are ejected from the diluent and food component nozzles, respectively in diluent and food component streams, directly into the container. The delivery device and diluent nozzle(s) are further configured for ejecting a stream of diluent at a predetermined spatial configuration in which the diluent stream impacts on at least one internal wall of the container and within a velocity range effective to create turbulence and mix the food component so to produce the food product. A preferred container is a drinking cup, although other embodiments are preferably configured for dispensing a small number of servings, preferably one to two, into a container for immediate personal consumption, although other embodiments can dispense a greater number of servings, such as less than five or ten. The preferred dispenser is a food-service beverage dispenser. In the preferred embodiment, the diluent nozzle is configured for ejecting the diluent stream at an angle relative to vertical. The diluent nozzle is preferably inclined relative to vertical by more than 5 degrees.

In the preferred embodiment, the delivery device and diluent nozzle are further configured for ejecting at least one stream of fluid, and preferably two or more, in a predetermined spatial configuration relative to vertical and within a velocity range effective to produce a layer of foam on the food product wherein the ratio foam-to-liquid obtained within a minute, after the food and diluent have been dispensed, in the container is of at least 1:5, more preferably, of at least 1:4, most preferably from about 1:3 to 1:1. The configuration of the stream(s) of diluent is such that no significant splashing can occur from the container.

In a preferred embodiment, the stream or streams dispensing conditions are such that no significant splashing is provided and the streams in the region from the nozzles to the container are unsupported by any funneling or diluent protection structure. Therefore, cleaning is eliminated while a proper mixing of the food product is carried out in the container.

In one embodiment, a second diluent nozzle is provided which produces a second diluent stream that impacts on an internal wall and/or bottom wall of the container at an impacted location which is offset to the first diluent stream produced from the first diluent nozzle. The second diluent nozzle is preferably oriented to direct a diluent stream relative to vertical of from 0 to 30 degrees, more preferably, of from 0 to 10 degrees, most preferably of from 0 to 5 degrees.

The delivery device is configured to deliver diluent from the diluent nozzle(s) at a diluent flow rate and linear velocity of between about 1 and 120 ml/s and 10 and 3,500 cm/s, respectively.

In one embodiment, the diluent nozzle comprises a single orifice per nozzle so to form a single thin stream of diluent to impart a velocity which can be sufficiently high to provide a thorough, rapid mixing with high turbulence in the container and absence of stratification issue. A single orifice nozzle is preferred to produce a thick layer of foam on the top of the food product.

In another embodiment, the diluent nozzle comprises a plurality of orifices to form a plurality of streams forming a showerhead configuration. The number of shower-like nozzle orifices may vary from 2 to 30, more preferably 3 to 5 orifices. A shower-like nozzle provides a reduced linear velocity and therefore this configuration is preferred when a food product with a low amount of foam or no foam is desired.

The dispenser may comprise a plurality of food component sources; a plurality of food component nozzles for dispensing different food components from the food component sources in the container; and the delivery device may be configured for selectively activating and deactivating the flow from the food component nozzles for dispensing a selected combination of one or more of the food components in the container depending on the type of beverage product selected for dispensing. The dispenser can deliver foamy cappuccinos, as in one embodiment, one food component source can contain a milk based or milk concentrate and the other food component source can contain a coffee based concentrate.

The invention also relates to a method of preparing a food product from a food product dispenser, comprising directing separate streams of diluent and flowable food components into a container, wherein at least one stream of diluent forms an inclination angle relative to vertical and, wherein the diluent stream impacts on at least one wall of the container within a velocity range effective to create turbulence and mix with the food component so to produce the food product.

DETAILED DESCRIPTION OF THE PREFERRED EMBODIMENTS

Figure 1:
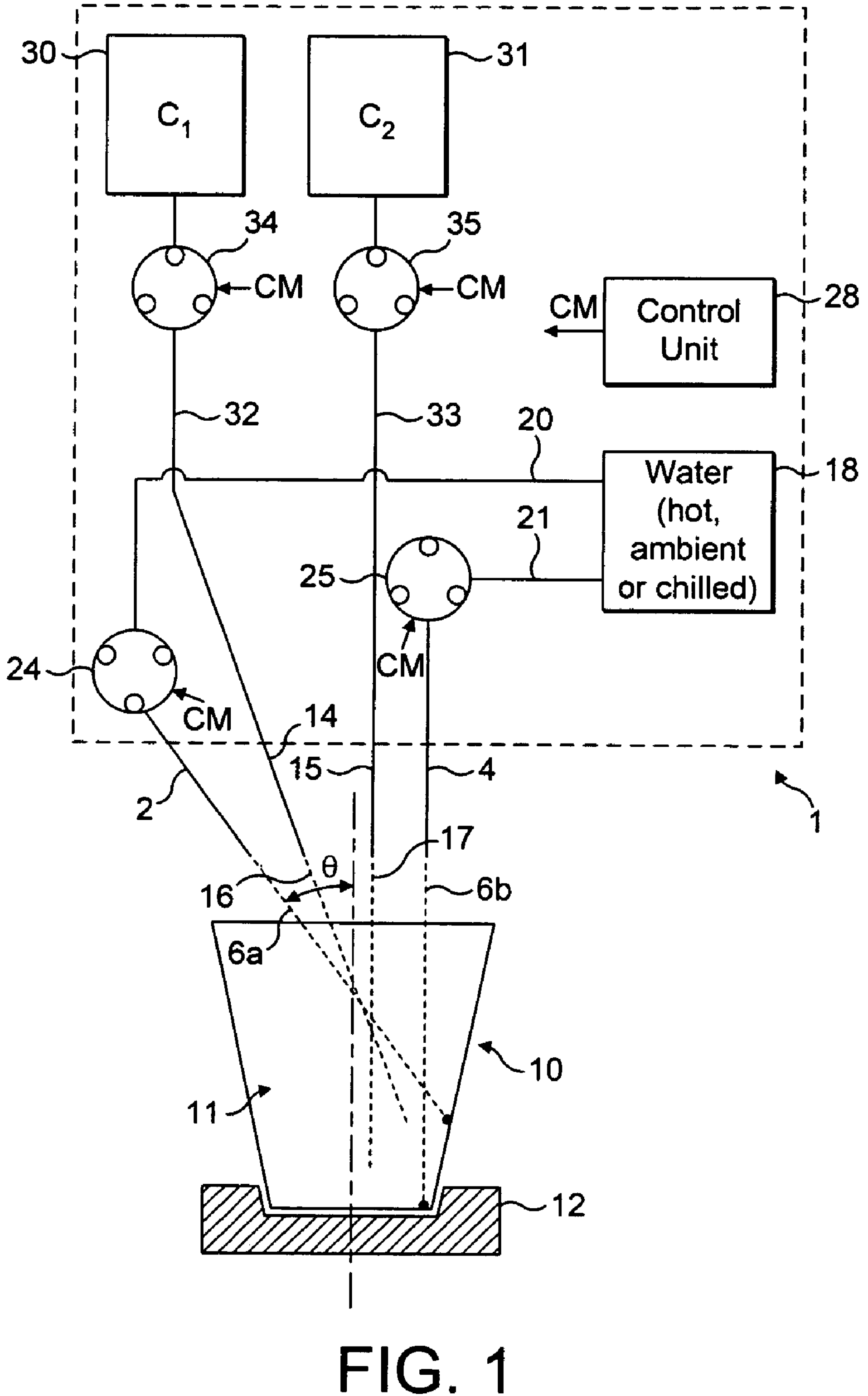
FIG. 1 is a diagram schematically showing one embodiment of a beverage dispensing device according to the invention.

The present invention can provide a device for dispensing a hot or cold beverage that is hygienic, efficient, compact, and relatively low cost to run and maintain. This can be obtained without the use of a mixing or whipping chamber, which consequently requires very little maintenance and is highly hygienic. A preferred embodiment of the invention provides a device for dispensing a hot or cold beverage which is able to deliver a beverage with good foaming at fairly high temperatures (typically above 65° C.) and able to deliver an homogeneous non-heated beverage (typically between 5 and 16° C.), without requiring the use of mechanical whipping mechanism, producing uniform high quality beverages from a concentrate. The preferred embodiment is also preferably suitable for large scale, high volume usage. The food product dispenser of the invention will be described as a beverage dispenser but other dispensers such as sauce, soup or stock dispensers are intended to be within the scope of the invention.

The invention concerns a device for dispensing a beverage comprising a diluent source, at least one diluent nozzle, at least one food component source in flowable form, at least one food component nozzle and a delivery device connecting the diluent source to the diluent nozzle and the food component source to the food component nozzle. The delivery device and nozzles are configured such that the diluent and food component are ejected from the diluent and food component nozzles, respectively, in diluent and component streams, directly in the container. The delivery device and diluent nozzle are further configured for ejecting the streams of diluent at a spatial configuration in which the diluent stream impacts on at least one internal wall of the container and within a velocity range effective to create turbulence and mix with the food component to produce the food product. The term "fluid" in the present application means any sort of liquid diluents typically used for diluting a food component. Typically, the diluent is water, either hot water, ambient or refrigerated water but other diluents could be used such as milk or stock. The food component is a liquid food or beverage product and/or a liquid concentrate. The liquid concentrate can be chosen among the group consisting of coffee, cocoa, milk, juice, sucrose, high fructose corn syrup, flavor, nutritional and other concentrates, and a combination thereof. One advantage of a liquid food component resides in that the mixing and foaming are particularly effective in the whipperless system of the invention, both for hot and cold products delivered. Surprisingly, the mixing is improved (solubilization time reduced, homogeneous liquid, . . . ) and the level of foam can be significantly increased as compared to dry or powder components. The cold solubility problem met with dry and powder components are also eliminated and cold beverages can be obtained with an excellent mixing and, if required, higher foam attributes. Another advantage is the reduced storage space of the liquid concentrate packages as compared to powder canisters and the like and the reduced complexity for dosing and transporting the food component. Furthermore, in absence of whipper or mixing chamber, the device is even more simplified and more economical for a wider beverage offer.

In a preferred embodiment, the diluent nozzle is configured for ejecting the diluent stream at an angle relative to vertical.

A certain inclination of the diluent stream surprisingly improves the mixing and, also the foaming, when desired, by creating turbulence in the container while at the same time significantly reducing the splashing from the container. Although some embodiments can additionally use them, the preferred embodiments also have the advantage of not requiring the use of mixing bowls, impellers or mixing chambers to operate, thereby eliminating the costly cleaning procedures while improving hygienic performance. More particularly, the streams in the region from the nozzles to the container are unsupported by any funneling or diluent protection structure.

The diluent nozzle is also further spatially configured for ejecting the stream of diluent at a spatial configuration in which the diluent stream impacts on the internal sidewall and/or bottom wall of the container. In a preferred embodiment, at least one diluent stream impacts on the side wall of the container. In a preferred embodiment, the diluent nozzle is configured above the container so that the diluent or water stream is inclined relative to vertical of more than 5 degrees. Below 5 degrees, the water stream provides too much splashing and mixing and the foam level are not as good. The optimal range of inclination for the diluent stream is of from 10 to 35 degrees and, most preferably, of from 15 to 20 degrees with respect to vertical. The inclination is the maximal angle of inclination of the water stream as measured as compared to vertical. This particular stream orientation tends to confer a water vortex effect in the container which improves the mixing and reduces significantly the mixing time.

Preferably, a second diluent or water nozzle produces a second diluent or water stream that impacts at a lower angle than the first water stream of the first water nozzle. The second stream may impact on an internal wall or bottom wall of the container at an impacting point which is offset to the impacting point, preferably, at a lower position in the container, than the first diluent stream produced from the first diluent nozzle. An even preferred embodiment comprises two streams of diluent coming from two separate diluent nozzles; one stream impacting on the sidewall, the other diluent stream impacting on the bottom wall. As a result, in addition to a vortex effect, the second stream creates turbulence of the flow of liquid by disturbing the circular direction of the vortex flow. The resulting flow pattern becomes a disturbed flow pattern enhancing turbulence which so improves mixing. The second diluent nozzle is oriented preferably to direct a diluent stream relative to vertical of from 0 to 30 degrees, more preferably 0 to 10 degrees, even more preferably of from 0 to 5 degrees. These at least two streams, one at about 30 to 40 degrees and one at about 0 to 10 degrees, provide an optimal jet configuration where surprisingly good mixing and foaming have been noticed without incurring heterogeneity of the liquid in the end beverage (i.e., “stratification”).

The sidewall(s) of the container can be straight or angled without affecting the performance of the mixing of the streams provided that the streams are directed as described. Preferably, the sidewall of the container is slightly angled in a conventional manner such as that used for paper or styrofoam coffee cups. Thus, the container may have an angled sidewall of from 1 to 15 degrees. It is acceptable for the generating line of the sidewall to be straight or slightly rounded, either in a convex or concave manner. The bottom can be flat or may have a certain structure that enhances swirling of the fluid, such structure being a central apex or a dome, or projections that breaks the vortex flow (such as radial ribs or equivalent structures).

The conditions of the diluent streams regarding flow rates and linear velocity are important to consider depending on the result on the beverage product to be achieved, in particular, whether a foamy beverage or non-foamy beverage is desired. Proper mixing can be obtained more generally by configuring the delivery device in such a manner that the at least one (preferably two or more) diluent nozzles distributes the diluent stream at a diluent flow rate of between about 1 and 120 ml/s and the diluent velocity between 10 and 3,500 cm/s. Surprisingly, in combination with the flow rate and velocity of the water jets, the viscosity of the liquid concentrate plays an important role in the quality of the foam level and the resolution of the stratification problem. Preferred concentrate viscosity is between 1 and 5,000 cP, more preferably between 5 and 3,200 cP, and most preferably between 10 and 600 cP.

More specifically, for producing a foamed beverage, the delivery device is configured to deliver diluent from the diluent nozzle at a flow rate and a linear velocity of between about 5 and 40 ml/s, and 800 and 2750 cm/s, respectively, and the food component is a liquid concentrate having a viscosity between 1 and less than 5,000 cP. Most preferably, the linear velocity is set between about 10 and 40 ml/s and 10 and 650 cm/s, respectively, and the food component is a liquid concentrate having a viscosity between 5 and 600 cP. Highest viscosity values tend to provide a stable and thicker foam but this may cause more difficulty to mix the concentrate and this may cause stratification issues. An increase of the linear velocity may resolve this issue.

In these conditions, a thicker layer of foam with a more homogeneous bubble distribution is obtained as compared to when working outside of the given ranges. The amount of foam is also greater than with dry powder components. The ratio foam-to-liquid obtained within a minute, after the food component and diluent have been dispensed, in the container can be of at least 1:5. In general, the ratio foam-to-liquid obtained is between 1:4 and 1:1; which is far more than one can usually expect to get when using dry or powder components.

In conditions for a non-foamed beverage, the delivery device is configured to deliver diluent from the diluent nozzle at flow rate and at linear velocity of between about 10 and 40 ml/s and 10 and 650 cm/s, respectively, and the food component is a liquid concentrate having a viscosity between 5 and 600 cP. Most preferably, the flow rate is set between 10 and 40 ml/s, the linear velocity is set between about 10 and 150 cm/s, respectively, and the food component is a liquid concentrate having a viscosity between 10 and 600 cP.

As a common denomination, “delivery device” means in general all mechanical elements enabling to transport both the diluent and the food component(s) at the required flow rating conditions. The delivery device of the invention may comprise a first pumping mechanism arranged between the water source and each water nozzle for controlling the water flow rate, and a second pumping mechanism arranged between each of said liquid concentrate sources and said concentrate nozzles for controlling the flow rate of the liquid concentrate. Both the amount of water and the amount of concentrates can thus be supplied and dosed in an appropriate and accurate manner. Preferably, the pumping mechanisms are pulse delivery type pumps, such as a peristaltic pumps. Indeed, the use of this type of pump allows an improved mixing and foaming of the dispensed liquids by creating pulsing of thereof. Other delivery device can include gear pumps, centrifugal pumps, vane pumps or diaphragm pumps.

In another embodiment, the diluent delivery device comprises for supplying the diluent under pressure through the nozzle, a pumpless diluent line under pressure connected to the tap water supply when tap water pressure is sufficient to provide the required flow rates and velocity. Preferably, a controllable flow reductor is associated to the pumpless water pressure line to control the flow rate and velocity of the diluent along the line. The flow reductor can be electronically controlled by the control unit to vary the flow rate and linear velocity.

Advantageously, the device of the invention can further comprise thermal exchange units for heating or cooling the sources to offer the option of dispensing hot or cold beverages on demand.

Other features and advantages of the present invention will appear more clearly upon reading the following description of preferred embodiments of the dispensing system according to the present invention, this description being made with reference to the annexed drawings.

Referring to FIG. 1, a first embodiment of a beverage dispensing device according to the invention capable of implementing the method of the invention is shown and designated by the general reference numeral 1. A beverage is herein to be understood to mean any beverages, hot or cold, that can be prepared from at least one concentrate such as a syrup, a coffee concentrate, a cocoa concentrate, a milk concentrate, tea or juice concentrate, etc. or a combination thereof, mixed with a liquid such a water to produce a beverage suitable for consumption such as a soft drink, a coffee drink, etc. As will be explained hereinafter, the beverage dispensing device according to the invention is also able to produce and dispense a beverage with a foam layer having a good consistency and stability.

In the embodiment shown in FIG. 1, dispensing device 1 comprises a first nozzle 2 and a second nozzle 4 for supplying a diluent such as water. The water in this embodiment is supplied in the form of a first stream or jet 6*a* and a second stream or jet 6*b* of water through the atmosphere from water ejection orifices. Fluids other that water can alternatively be used. Water jets 6*a* and 6*b* are directed respectively along a first path and a second path toward the inside 11 of the container 10. Nozzles 2 and 4 are oriented with respect to vertical so that first jet 6*a* and second jet 6*b* are offset to each other and impact on a different region or point in the inside of the container. The first nozzle 2 is configured to direct the water jet 6*a* at a positive angle θ greater than 5 degrees with respect to vertical, preferably between 10 and 35 degrees relative to vertical, in such a manner that the jet impacts on the sidewall of the container. Preferably, the stream should impact on the sidewall of the container at a height in the container at or above the first lower quarter of the container. The second jet 6*b* is also configured to direct a second jet at an angle lower than jet 6*a*, preferably of between 0 and 10 degrees from vertical so that it preferably impacts at a lower height in the container. As illustrated in FIG. 1, one preferred configuration for jet 6*b* is to have it impacting the bottom of the container. The preferred combination of jets enables to obtain a surprisingly rapid mixing and a high level of foam of good quality, at the previously defined specific foam conditions, while avoiding splashing from the cup.

The dispensing device further comprises a third nozzle 14 and fourth nozzle 15 for supplying, respectively a first and second concentrates in the form of, respectively, a first jet or stream 16 of concentrate, and a second jet or stream 17 of concentrate. into the container. Nozzles 14 and 15 are oriented so that the concentrates are preferably at a level sufficiently low to be rapidly and entirely wiped by the water streams. Preferably, the concentrate so impacts in the container at a lower height than the water streams. Preferably, the nozzles 14 and 15 direct the concentrate stream at an angle between 0 and 20 degrees, more preferably 0 to 10 degrees.

Diluent nozzles 2,4 are connected respectively to a source 18 of fluid, such as water in the present example, via supply lines 20, 21. In this embodiment, which allows the production of both hot and cold beverages, either supply lines 20 or the source of diluent itself can be associated to a thermal exchange unit.

The supply lines are also connected to diluent pumps 24, 25 which are all controlled by a control unit 28, such as microcontroller CM in the drawings.

Preferably, the thermal exchange unit (not represented) is of the on-demand, tankless, water heating/cooling type, connected to a water tap line. In an alternative embodiment, a hot water tank or cooling tank can be used instead or in additional to the thermal exchange unit. Preferably, at least one of the pumps is configured to deliver pulses of the diluent or food component. Pumps 24, 25 which allow the water flow rates to be controlled, are preferably of the pulsing water-delivery type, such as a peristaltic pump. This type of pumps allows pulsed water jets to be generated, providing the advantage of contributing to the mixing of the water and the concentrate and to the production, amount and quality of the foam layer formed on the dispensed beverage. It will be noted, however, that the peristaltic pump can be replaced by another type of pump, such as diaphragm pump, or can be omitted if tap water pressure is sufficiently high for generating an appropriate water flow rate.

Concentrate nozzles 14, 15 are connected to respective sources of liquid concentrate 30, 31 via respective supply lines 32, 33 including respective pumps 34, 35 controlled by control unit 28. Pumps 34, 35 which allow the concentrate flow rate to be controlled, are preferably of the same type as pumps 24, 25 described above. The source of liquid concentrate 30 would typically be formed of a pouch filled with liquid concentrate arranged in an appropriate holder for easy refill. The concentrates used for dispensing are preferably shelf-stable due to their formulation. Typically, appropriate liquid concentrates contain 0.1-0.2% potassium sorbate, and have a pH less than 6.3 and water activity less than 0.85. Concentrate:/water dilution ratios may vary of from 1:100 to 1:2 depending on the nature of the concentrate. For example, pure coffee concentrate typically ranges of from 1:100 to 1:4, more preferably from 1:50 to 1:10. Milk concentrate typically ranges of from 1:10 to 1:3. A single source of combined concentrates can also be used such as a liquid blend of coffee and/or cocoa, a whitener (e.g., milk based or non-dairy based whitener) and, optionally, sweetener (e.g., sugar or non-sugar sweetener). Concentrate: water dilution ratios for such combinations may typically vary of from 1:6 to 1:2.

Water nozzles 2, 4 and concentrate nozzles 14, 15 may be structurally independent of each other to allow easy adjustment of their respective orientation. But the water nozzles and the concentrate nozzles may alternatively be constructed in a single integral or unitary unit, thereby preventing disorientation and facilitating the maintenance and/or the replacement of these nozzles.

Typically, the diameter of ejection orifice of water nozzles 2 and 4 ranges from about 0.075 to about 9.5 mm, more preferably 0.1 to 3, and is most preferably of about 0.5 to 1.2 mm.

The liquid concentrate viscosity plays an important role in achieving a good mixing and dilution with the water for the production of a high quality beverage. In a preferred embodiment, the concentrate viscosity is selected within the range from preferably about 1 cP, more preferably from about 10 cP, and most preferably from about 100 cP, to preferably about 5,000 cP, more preferably to about 3,200 cP, even more preferably to about 2,200 cP, and most preferably to about 600 cP.

It should be noted that the water linear velocity through nozzles 2 and 4 not only affects achieving a good mixing, but also the control of the amount of foam created on top of the beverage. Tests have shown that water linear velocity for foamy beverages should be controlled to range from preferably about 800 cm/s, more preferably from about 2750 cm/s, and most preferably from about 1100 cm/s, preferably to about 2500 cm/s, taking into account that a higher water velocity produces a higher amount of foam. However one will note in this respect that very high linear velocity results in undesirable foam appearance (very large bubbles) and texture and splashing.

To achieve whiter foam, water may be delivered for a slightly longer period than the concentrates. On the other hand, linear velocity should preferably not exceed about 650 cm/s for preparing a beverage without foam. The water linear velocity can be readily adjusted via an adequate control of the pumps 24, 25 by control unit 28.

The water flow rate also plays a role in the production of the foam on top of the beverage with respect to the initial foam-to-liquid ratio and the stability of the foam after delivery.

Tests have also shown that the relation between concentrate viscosity and flow rate plays a significant role for mixing, especially at ambient temperature. For highly viscous concentrate, having a viscosity on the order of 2200 cP, such as cocoa liquid concentrate, good mixing of the concentrate with the water requires a water linear velocity of about 1800 cm/s, while for less viscous concentrate, having a viscosity of the order of 550 cP, such as coffee concentrate, a water linear velocity of about 1500 cm/s produces a homogeneous beverage.

Moreover, to avoid stratification of the liquid portion of the beverage, i.e., the amount of heterogeneity of the liquid portion, care must also be taken to adjust the water linear velocity through nozzles 2, 4 as a function of the viscosity of the liquid concentrate. Tests have shown the lower the viscosity and the higher the water linear velocity, the less stratification and that substantially no stratification was observed with viscosity below about 2500 cP and water linear velocity greater than 1800 cm/s for liquid concentrate. Interestingly, tests have also shown that beyond a certain value of viscosity (more than 5,000 cP), the increase of velocity and diluent temperature was pointless to avoid stratification.

Regarding the food component or concentrates, concentrate flow rate ranges of from 1.5 to 40 mL/s and the food component is a liquid concentrate of viscosity comprised between 10 and 5,000 cP. The flow rate, viscosity and velocity conditions may vary depending on the type of concentrate.

Figure 2A:
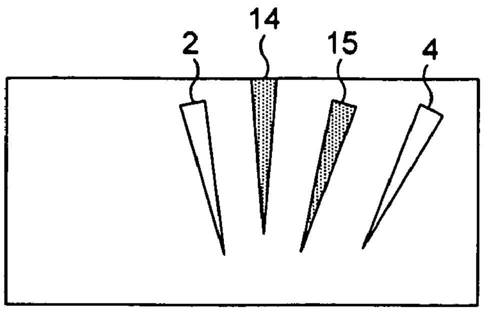
FIG. 2*a* is a front view of a detail showing schematically an example of spatial orientation of the nozzles of a food dispensing device according to the invention comprising one concentrate nozzle and three water nozzles.
Figure 2B:
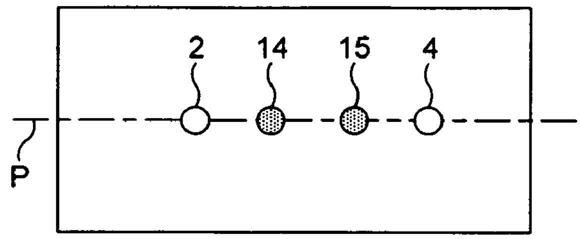
FIG. 2*b* is a cross-sectional bottom view of the water and concentrate nozzles shown in FIG. 2*a;*

Referring now to FIGS. 2*a*, 2*b*, 3*a*, 3*b* two other embodiments of a beverage dispensing device according to the invention capable of implementing the method of the invention comprising two concentrate nozzles and two water nozzles are shown. Similar or identical elements to these described in connection with FIG. 1 bear the same reference numerals. FIGS. 2*a* and 2*b* show another example of a spatial orientation of the nozzles of a beverage dispensing device comprising a coffee concentrate 14 and a milk concentrate nozzle 15 and two water nozzles 2, 4, the streams or jets delivered by these nozzles being directed toward the container where the mixing of the water and at least one liquid concentrate occurs. In this example the four jets are arranged in alignment along a vertical plane P. As in the first embodiment, the angle formed of the water jets may vary between 0 to 80 degrees, preferably from 10 to 35 degrees, and most preferably from 25 to 35 degrees relative to vertical; the choice of this angle depending on the mixing and foaming performance desired and also on the room necessary for accommodating the number of concentrate nozzles arranged within the perimeter defined by the water nozzles.

Figure 3A:
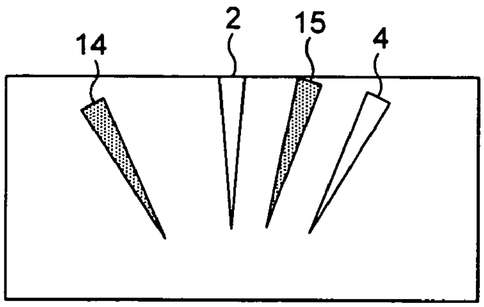
FIG. 3*a* is a front view of a detail showing schematically another example of spatial orientation of the nozzles of a food dispensing device according to the invention comprising two concentrate nozzles and two water nozzles.
Figure 3B:
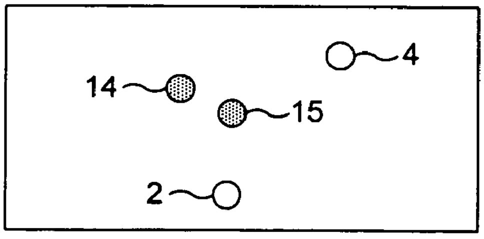
FIG. 3*b* is a cross-sectional bottom view of the water and concentrate nozzles shown in FIG. 3*b;*

FIGS. 3*a*, 3*b* show another embodiment in which the food concentrate nozzles and water nozzles are not placed within a same vertical plane. This embodiment may offer a wider choice for varying the angles of the diluent and concentrate streams than the previous embodiment.

FIGS. 4*a* to 4*h* shows examples of various combinations of water and concentrate nozzles for the dispensing device of the invention.

Figures 4A, 4B, 4C, 4D, 4E, 4F, 4G, 4H:
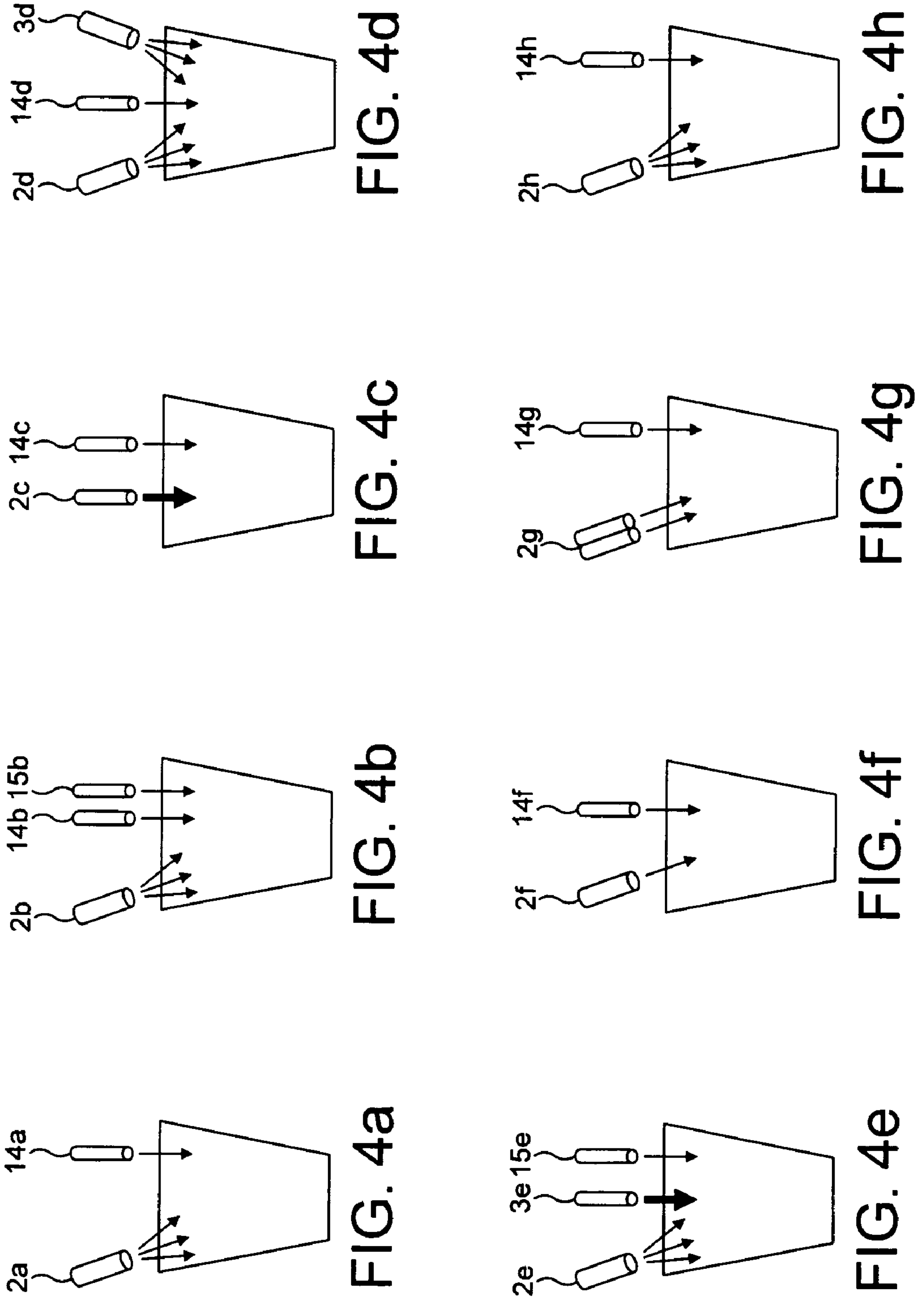
FIG. 4*a* to 4*h* schematically illustrate various embodiments of the device of the invention with water and concentrate nozzles placed above a container.

FIG. 4*a* shows a shower-like water nozzle 2*a* in angular configuration and a vertically oriented food concentrate nozzle 14*a*.

FIG. 4*b* shows a shower-like water nozzle 2*b* in angular configuration and two vertically oriented concentrate nozzles 14*b*, 15*b*.

FIG. 4*c* shows a vertically oriented single-orifice water nozzle 2*c* and a vertically oriented concentrate nozzle 14*c*.

FIG. 4*d* shows two shower-like inclined water nozzles 2*d*, 3*d* and one vertically oriented concentrate nozzle 14*d*.

FIG. 4*e* shows an inclined shower-like water nozzle 2*e*, a vertically oriented single-orifice water nozzle 3*e* and a vertically-oriented concentrate nozzle 15*e*.

FIG. 4*f* shows an inclined single-orifice water nozzle 2*f* and a vertically oriented concentrate nozzle 14*f*.

FIG. 4*g* shows an inclined two-stream nozzle 2*g* and a vertically oriented concentrate nozzle 14*g*.

FIG. 4*h* shows an inclined conical stream nozzle 2*h* and a vertically oriented concentrate nozzle 14*h*.

Of course many other variations of these examples are possible by skilled artisans having this disclosure before them, and all of these remain within the scope of the invention.

Figure 5:
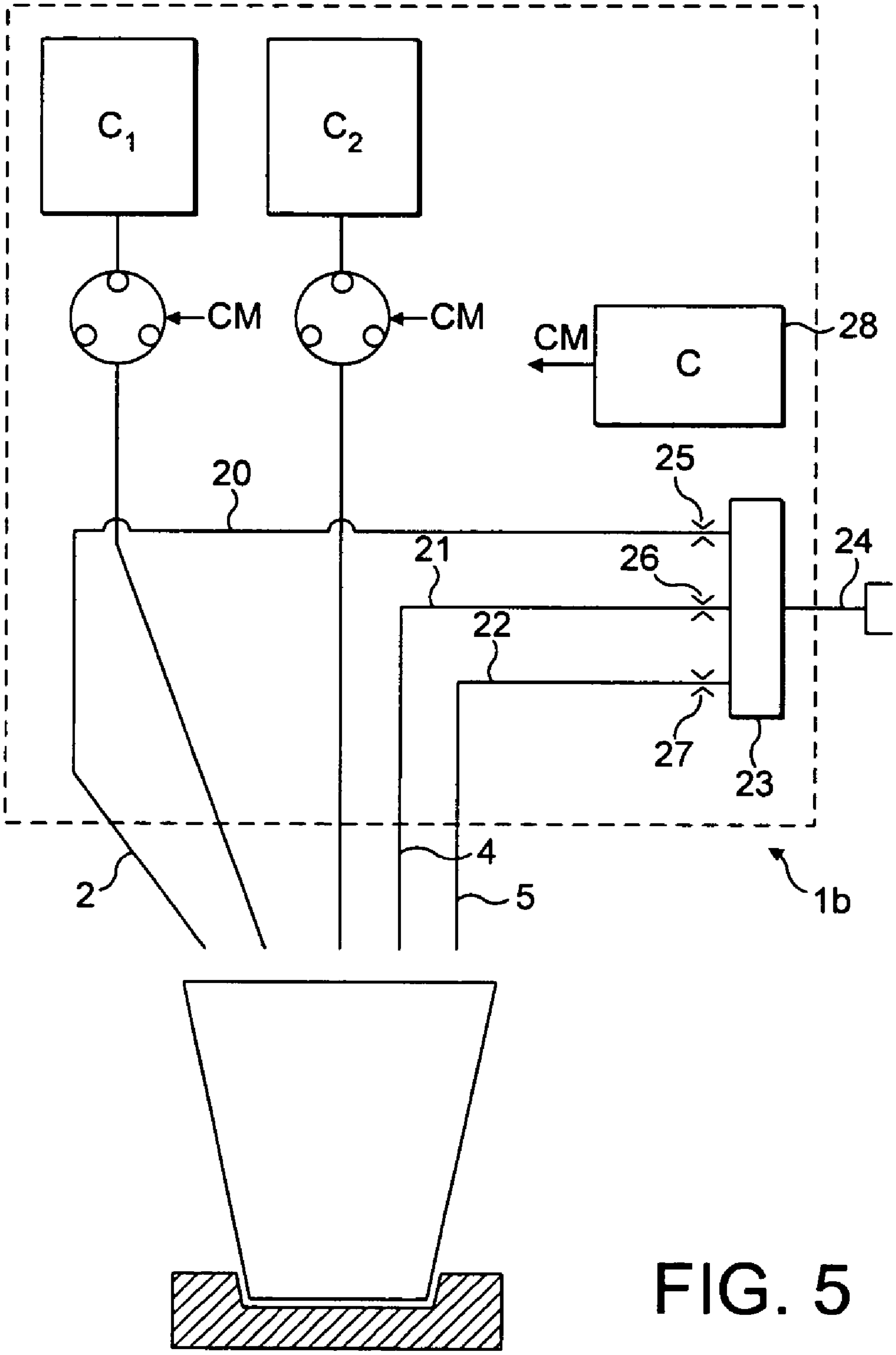
FIG. 5 a diagram schematically showing another embodiment of a beverage dispensing device according to the invention.

Another embodiment of the dispenser of the invention is illustrated in FIG. 5. The dispensing device 1*b* comprises a first diluent nozzle 2, a second diluent nozzle 4 and a third diluent nozzle 5 connected respectively to diluent lines 20, 21, 22. The fluids lines are free from positive displacement pumps as opposed to the embodiment of FIG. 1 but are associated in diluent communication with a manifold 23 that distributes water through each line 20-22 from a tap water conduit. The pressure of water supply is of from 10 to 50 psi, typically between 20 and 40 psi to provide a sufficient pressure in the diluent lines and to deliver the flow rate and velocity in the predetermined ranges. Flow reductors 25, 26, 27 are respectively positioned along each diluent line 20, 21, 22 to vary in controllable manner the flow rates and velocity according to the beverages to be produced. The reductors are associated in signal communication with the controller 28 to receive input from the controller to restrict or enlarge the flow opening of each diluent line according, for example, to programmed functions in software(s) stored in the control unit. The reductor may be any suitable flow reduction device such as a needle vane and the like. In a possible variant, one single flow reductor could replace the flow reductors 25-27 and so be placed before the manifold to control the flow of all diluent lines 20, 21, 22 at a time. However, separate controls of the flow are preferred, in particular, since one of the diluent line, preferably vertically oriented diluent line 22, can serve to ensure a sufficient amount of water is delivered for proper dilution within the delivery time, in particular, for large volume beverages. The diluent line 22 and its nozzle 5 can be set at a lower velocity but a higher flow rate than the two other lines/nozzles in order to add a sufficiently large amount of water for large beverages while the two other diluent lines have the function to ensure the mixing and eventually foaming of the beverage.

A method for preparing a beverage comprising a mixture of liquid and at least one liquid concentrate will now be described hereinafter in connection with the embodiment shown in FIG. 1. In a first step, the container 10 is placed in a serving position on a dispensing bay or support 12 of dispensing device 1 so as to be in the path of the dispensed water and concentrate streams, substantially below water and liquid concentrate ejection orifices of the water nozzles 2 and 4 and concentrate nozzle 14. The dispensing bay is configured for receiving the container at a dispensing location for receiving the food product therein in the defined position. The dispensing bay may, for instance, comprise a recess which matches with the shape of the external bottom part of the container. The bay may also comprise a ring, a magnet, a press-fitting connection or any sort of referential placing means. The container (e.g., through the bay) and nozzle(s) assembly are preferably non-moveable. However, although not preferred as adding complexity to the dispenser, a rotary mechanism can be provided to allow to move the dispensing bay and nozzle(s) assembly relative to each other.

Upon actuation of a switch on a user's selection board associated with the control unit 28, the control unit 28 causes first the activation of water pumps 24, 25 and the opening of water valves, if any, to produce the water jets 6*a* and 6*b* in air via water nozzles 2 and 4 respectively along a first and a second paths from water source 18. The water nozzles 2 and 4 are oriented so that the waterjets 6*a* and 6*b* thus produced impacts on the inside of the container 10, at high speed but without splashing, as aforementioned.

If a hot beverage desired, such as based on a user input, control unit 28 will also activate thermal exchange unit so as to heat the water to the desired temperature. Control unit 28 also causes the activation of selected concentrate pumps 34 or 35, or both 34 and 35, and the opening of concentrate valves (if any) to produce concentrate stream(s) 16 or 17 or, both 16 and 17, in air via the concentrate nozzles 14 or 15, or both 14 and 15, along paths 32, 33 or, both 32 and 33, from concentrate sources 30 or 31, or both 30 and 31. Once the quantity of water and concentrate to be delivered has been reached control unit 28 causes the pumps 24, 25, 34 or 35, or both 34 and 35, to stop.

Based on the user's selection, the control unit operates the water pumps within the range of flow rates that corresponds to the selected product. Linear velocity may be controlled by different means. In one possible embodiment, the velocity is controlled by varying the speed of the pumps. For peristaltic pumps, for instance, the speed is varied by varying the voltage distributed to the pump. In another possible embodiment, the food product dispenser comprises at least one controllable flow reductor placed along of the diluent line(s) before the diluent nozzle(s). The flow reductor has a flow opening that can be adjusted in size by any suitable mechanical valve means such as a needle or the like. The flow reductor is preferably controlled electronically by the control unit 28 although a manual control can be envisaged.

The control unit 28 can be configured for controlling the delivery device that allows dosing of the diluent and food components at any sequence. However, in a preferred embodiment, the control unit is configured for controlling the delivery device for substantially ejecting the diluent and food component(s) substantially with a certain overlap period where both diluent and food component(s) are simultaneously ejected so that mixing is more efficient and the dispense period is shortened. Preferably, the unit also controls the delivery device to eject water before and/or after food component has been ejected in order to complete the dilution and/or the mixing of the food product. The completion of the dilution can also be achieved advantageously by a third stream of diluent of lower velocity but higher flow rate then the first and second diluent streams, in particular, when large volume beverages are desired, e.g., of more than 110 mL. It should be noted that control unit 28 is preferably arranged so as to cause the concentrate to be delivered only when water jets are produced. In that respect it will be noted that in the case where more than one water pump is used, the control of these water pumps is preferably arranged so as to deliver the water jets in a synchronized manner, at least during the delivery of the concentrate, to achieve the desired mixing effect. However, according to the desired dosage of concentrate in the beverage, control unit 28 can be arranged so as to start the delivery of the concentrate either simultaneously with or after the start of water delivery and stop the delivery of concentrate either before or simultaneously with the water delivery. In that respect it should be noted that the delivery of concentrate can be stopped before the water so that the foam produced becomes whiter. The controller may thus be arranged so as to switch the liquid concentrate sources on or off sequentially or simultaneously at any desired dosing time intervals according to the final mixture formulation requirements.

In the following examples, various beverages have been prepared in connection of a dispensing device and method of the invention, various preparation parameters have been experimented.

EXAMPLES

Example 1

A cappuccino beverage was prepared using two water jets. The position of water jets are: first jet is 15 degree (from vertical) in one plane and angled by 20 degree in the direction of the plane perpendicular to the first one; second jet was vertical in both perpendicular planes. Flow rate and linear velocity of water jets were 20 ml/s and ~1800 cm/s, respectively. A liquid concentrate containing milk proteins, sugar and coffee was dispensed at 10 ml/s flow rate with linear velocity of ~35 cm/s. Viscosity of the liquid concentrate was ~600 cP. Water temperature was 85° C.; the concentrate was kept at ambient temperature.

No liquid stratification, and high foam-to-liquid ratio (about 0.7) were visually observed. Further, foam was very stable and stiff, and desirable appearance with a uniform distribution of small bubbles was observed in dispensed cappuccino drink. No splashing from the cup was observed.

Example 2

A mochaccino beverage was prepared using two water jets. The position of water jets are: first jet is 15 degree (from vertical) in one plane and angled by 20 degree in the direction of the plane perpendicular to the first one; second jet was vertical in both perpendicular planes. Flow rate and linear velocity of water jets were 20 ml/s and about 1800 cm/s, respectively. A liquid concentrate containing milk proteins, sugar and cocoa was dispensed at 4.5 ml/s flow rate with linear velocity of about 15 cm/s. Viscosity of the liquid concentrate was about 5,000 cP. Water temperature was 85° C.; the concentrate was kept at ambient temperature.

Stiff foam with high foam-to-liquid ratio and no liquid stratification was observed in the dispensed drink. Also, no splashing from the cup was observed.

Example 3

A mochaccino beverage was prepared under conditions provided by Example 2 but with flow rate and linear velocity of waterjets of 30 ml/s and 2750 cm/s, respectively.

Stiff foam with high foam-to-liquid ratio and no liquid stratification were observed. Foam bubble sizes were acceptable but larger than in Example 1. Also, no splashing from the cup was observed.

Example 4

A mochaccino beverage was prepared under conditions provided by Example 3 but using a liquid concentrate containing milk proteins, sugar and cocoa with viscosity of 5,400 cP.

Stiff foam with high foam-to-liquid ratio similar to that in Example 3 but liquid stratification (poor mixing with undissolved portion of cocoa concentrate at bottom of the cup) was observed in the dispensed drink. Also, no splashing from the cup was observed.

Example 5

A mochaccino beverage was prepared under conditions provided by Example 4 (concentrate viscosity of 5,400 cP) but using water jets with linear velocity of about 4,000 cm/s.

Liquid stratification and splashing from the cup was observed. Foam was stiff with high foam-to-liquid ratio. Foam bubble sizes were slightly higher than that in Example 4.

Example 6

A mochaccino beverage was prepared under conditions provided by Example 4 but using water at 95° C.

Liquid stratification still was observed. Further, no splashing as in Example 4 from the cup was observed. Foam characteristics were also similar to that in Example 4.

Example 7

A cappuccino beverage was prepared using two water jets. The position of water jets are: first jet was 15 degree (from vertical) in one plane and angled by 20 degree in the direction of the plane perpendicular to the first one; second jet was vertical in both perpendicular planes. Water flow rate and linear velocity were about 17.5 ml/s and about 1500 cm/s, respectively. Coffee liquid concentrate was dispensed at flow rate 5 ml/s with linear velocity of ~15 cm/s. Milk liquid concentrate was dispensed at flow rate 20 ml/s with linear velocity of ~120 cm/s. Viscosities of the milk and coffee liquid concentrates were ~10 and 550 CP, respectively. Water temperature was 85° C.; concentrates were kept at ambient temperature.

No liquid stratification and high foam-to-liquid ratio (~0.8) were observed. Further, foam was very stable and stiff (~200 seconds by "sphere" test compared to target 8-10 seconds), and had desirable appearance with a uniform distribution of small bubbles. Overall, quality of the foam was found to be similar to that prepared using steam. Also, no splashing from the cup was observed.

The foam stiffness ("sphere" test) was measured by placing a 5/16" nylon sphere on the surface of the foam, such that it exerts a normal downward stress. The time in seconds required for the sphere to disappear beneath the foam surface was recorded, and used as an indicator of foam stiffness.

Example 8

A cappuccino beverage was prepared using two water jets. The position of water jets are: first jet is 15 degree (from vertical) in one plane and angled by 20 degree in the direction of the plane perpendicular to the first one; second jet was vertical in both perpendicular planes. Water flow rate and linear velocity were 25 ml/s and ~2250 cm/s, respectively. Coffee liquid concentrate was dispensed at flow rate 5 ml/s with linear velocity of ~15 cm/s. Milk liquid concentrate was dispensed at flow rate 20 ml/s with linear velocity of ~120 cm/s. Viscosities of the milk and coffee liquid concentrates were ~10 and 550 CP, respectively. Water temperature was 85° C.; concentrates were kept at ambient temperature.

No liquid stratification and high foam-to-liquid ratio (1.0) were observed. Further, foam of dispensed cappuccino drink was very stable and extremely stiff (~850 seconds by "sphere" test), and has desirable appearance with a uniform distribution of small bubbles. Overall, quality of the foam was found to be similar to that prepared using steam. Also, no splashing from the cup was observed.

Example 9

A cappuccino beverage was prepared using two water jets under conditions provided by Example 8 but using water jets with linear velocity of ~4,000 cm/s.

No liquid stratification was found in the dispensed beverage. However, splashing from the cup was observed.

Example 10

A cappuccino beverage was prepared using two water jets under conditions provided by Example 8 but the position of water jets were: first jet was 5 degree (from vertical) in one plane and vertical in the direction of the plane perpendicular to the first one; second jet is vertical in both perpendicular planes.

No liquid stratification was found in the dispensed beverage. However, a high splashing from the cup was observed.

Example 11

A cappuccino beverage was prepared using two water jets under conditions provided by Example 8 but using water jets with velocity of 600 cm/s.

No liquid stratification was found in the dispensed beverage, and practically no foam was observed. Also, no splashing from the cup was observed.

Example 12

A cappuccino beverage was prepared using two water jets under conditions provided by Example 8 but using water jets with velocity of 10 cm/s.

No liquid stratification was found in the dispensed beverage, and no foam was observed. Also, no splashing from the cup was observed.

Example 13

A chocolate beverage was prepared using two water jets. The position of water jets are: first jet is 15 degree (from vertical) in one plane and angled by 20 degrees in the direction of the plane perpendicular to the first one; second jet was vertical in both perpendicular planes. Water flow rate and linear velocity were 20 m/s and ~1800 cm/s, respectively. Cocoa liquid concentrate was dispensed at flow rate 5 ml/s with linear velocity of ~15 cm/s. Milk liquid concentrate was dispensed at flow rate 15 ml/s with linear velocity of ~100 cm/s. Viscosities of the milk and cocoa liquid concentrates were ~10 and 2200 CP, respectively. Water temperature was 85° C.; concentrate was kept at ambient temperature.

Good mixing with no liquid stratification, and high foam volume and stability with desirable appearance of bubbles were observed in dispensed chocolate drink.

Example 14

A mochaccino beverage was prepared using three water jets. The position of water jets are: first jet was 15 degree (from vertical) in one plane and angled by 20 degree in the direction of the plane perpendicular to the first one; second and third jets were vertical in both perpendicular planes. Water flow linear velocity was ~1200 cm/s, respectively. Coffee and cocoa liquid concentrates were dispensed at flow rate 5 ml/s with linear velocity of ~15 cm/s. Milk liquid concentrate was dispensed at flow rate 20 ml/s with linear velocity of ~120 cm/s. Viscosities of the milk, coffee and cocoa liquid concentrates were ~10, 550 and 2,200 cP, respectively. Water temperature was 85° C.; concentrates were kept at ambient temperature.

No liquid stratification and high foam-to-liquid ratio (~0.8) were observed in the dispensed beverage. Further, foam was very stable and stiff (~200 s by "sphere" test compared to target 8-10 s), and had desirable appearance with a uniform distribution of small bubbles. Also, no splashing from the cup was observed.

Example 15

A cappuccino beverage was prepared using two water jets under conditions provided by Example 8 but using water at ambient temperature. In addition, the liquids were dispensed in a cup containing ice (~½ of cup volume was filled with ~1.5×1.5×2 cm ice cubes before beverage dispensing).

Good mixing with no liquid stratification, and high foam volume and stability with desirable appearance of bubbles were observed in dispensed chocolate drink.

Example 16

A cappuccino beverage was dispensed over ice using water at ambient temperature under conditions provided by Example 15 but with the first water jet inclined by 5 degree from vertical.

A lot of splashing around a cup was observed.

It will be understood that the present invention has been described with reference to a particular embodiment, which is an illustration of the principles of the invention. Numerous modifications may be made by those skilled in the art without departing from the true spirit and scope of this invention defined by the appended claims. For example, depending on the number and type of beverages to be prepared the number of water nozzles and concentrate nozzles may vary and the control unit may be adapted, preferably with the dispensing device providing at least two water jets and one liquid concentrate stream that impact in the container for collecting prepared beverage.

For example, while the shape of the water jets and concentrate streams generated is preferably cylindrical one may envisage in variants using water jets and/or concentrate streams of different shapes such as for example of star, square, triangle, oval, oblong, or other cross-sectional shape. In variant one could also envisage arranging the ejection orifices of the liquid nozzles closer to the vertical axis, than that of the concentrate nozzles, and in another embodiment, the one or more of the concentrate streams can join and be directed together to the intersection location.

What is claimed is:

1. A food product dispenser comprising:

a diluent source;

at least two diluent nozzles, at least one of the diluent nozzles comprising at least one orifice of a diameter between about 0.075 and about 9.5 mm;

at least one food component source in a liquid form, the food component source comprising a viscosity between 1 and 5000 cP;

at least one food component nozzle; and a delivery device connecting the diluent source to the at least two diluent nozzles and the food component source to the food component nozzle, wherein the delivery device and nozzles are configured such that the diluent and food component are ejected from the diluent and food component nozzles, respectively, in diluent and component streams, directly into a container, wherein the delivery device and a first diluent nozzle are further configured for ejecting a first diluent stream so that the first diluent stream is inclined relative to vertical of from 10 to 35 degrees in which the diluent stream impacts on at least one internal wall of the container and within a velocity range effective to create turbulence and mix with the food component so to produce the food product, wherein the delivery device comprises a pump configured to deliver diluent from the at least one diluent nozzle at a diluent flow rate and linear velocity of between about 1 and 120 ml/s and 10 and 3,500 cm/s, respectively, and wherein the dispenser further comprises a second diluent nozzle configured for producing a second diluent stream relative to vertical of from 0 to 30 degrees that impacts on an internal or bottom wall of the container lower than that of the first diluent stream produced from the first diluent nozzle.

2. The dispenser of claim 1, wherein the diluent nozzle is configured for ejecting the diluent stream at an angle relative to vertical.

3. The dispenser of claim 1, wherein the diluent nozzle is further spatially configured for ejecting the stream of diluent at a spatial configuration in which the diluent stream impacts on the internal sidewall and/or bottom of the container.

4. The dispenser of claim 1, wherein delivery device and diluent nozzle are further configured for ejecting the stream of diluent in a predetermined spatial configuration relative to vertical and within a velocity range effective to produce a layer of foam on the food product wherein the ratio foam-to-liquid obtained within one minute after the food and diluent have been dispensed in the container is at least 1:5.

5. The dispenser of claim 1, wherein the streams in the region from the nozzles to the container are unsupported by any funneling or diluent protection structure.

6. The dispenser of claim 1, further comprising a dispensing bay configured for receiving a container at the dispensing location for receiving the food product therein in a defined position.

7. The dispenser of claim 1, wherein the diluent is water and the food component is a liquid concentrate, a liquid food or a beverage product concentrate.

8. The dispenser of claim 1, wherein the second diluent nozzle is oriented to direct a diluent stream relative to vertical of from 0 to 5 degrees.

9. The dispenser of claim 1, wherein, for producing a foamed beverage, the deli Very device is configured to deliver diluent from the diluent nozzle at a flow rate and a linear velocity of between about 5 and 40 ml/s, and 800 and 2750 cm/s, respectively, and the food component is a liquid concentrate having a viscosity between 1 and 5,000 cP.

10. The dispenser of claim 9, wherein for producing a foamed beverage, the delivery device is configured to deliver diluent from the diluent nozzle at a flow rate and linear velocity of from 15 to 30 ml/s, and 1100 to 2500 cm/s, respectively, and the food component is a liquid concentrate having a viscosity between 5 and 2200 cP.

11. The dispenser of claim 1, wherein for producing a non-foamed beverage, the delivery device is configured to deliver diluent from the diluent nozzle at flow rate and at linear velocity of between about 1 and 40 ml/s and 10 and 650 cm/s, respectively, and the food component is a liquid concentrate having a viscosity between 5 and 600 cP.

12. The dispenser of claim 11, wherein for producing a non-foamed beverage, the delivery device is configured to deliver diluent from the diluent nozzle at flow rate and at linear velocity of between about 10 and 40 ml/s and 10 and 150 cm/s, respectively, and the food component is a liquid concentrate having a viscosity between 10 and 500 cP.

13. The dispenser of claim 1, wherein the diluent nozzle comprises at least one orifice of a diameter of between 0.1 and 3.0 mm.

14. The dispenser of claim 13, wherein the diluent nozzle comprises a plurality of orifices to form a plurality of streams forming a showerhead configuration.

15. The dispenser of claim 1, wherein the delivery device comprises:

at least one diluent pump configured for pumping the diluent from the diluent source to the at least one diluent nozzle at a sufficient flow rate for producing the at least one diluent stream; and at least one food pump configured for pumping the food component from the at least one food component source to the at least one food component nozzle at a sufficient flow rate for producing the at least one food component stream.

16. The dispenser of claim 15, wherein the at least one of the pumps is configured to deliver pulses of the diluent or food component.

17. The dispenser of claim 16, wherein the pumps are peristaltic pumps, gear pumps, centrifugal pumps, vane pumps or diaphragm pumps.

18. The dispenser of claim 16, further comprising a controller associated with the pumps for controlling the flow rates and linear velocity.

19. The dispenser of claim 1, wherein the delivery device further comprises a pumpless diluent line under pressure connected to the tap water supply and, optionally, a controllable flow reductor to adjust the flow rate and linear velocity.

20. The dispenser of claim 18, further comprising a controller associated with the flow reductor for controlling the flow rates and linear velocity.

21. The dispenser of claim 1, further comprising a controller configured for controlling the delivery device for substantially ejecting diluent and food component a certain overlap period where both diluent and food component(s) are simultaneously ejected.

22. The dispenser of claim 21, further comprising a controller configured for controlling the delivery device for ejecting diluent before and/or after the food component is ejected to complete dilution and/or mixing of the food product.

23. The dispenser of claim 1, wherein the food component is a liquid concentrate chosen among the group consisting of coffee, cocoa, milk, juice, sucrose, high fructose corn syrup, flavor, nutritional and other concentrates, and a combination thereof.

24. The dispenser of claim 1, wherein:

the food component source comprises a plurality of food component sources; the food component nozzle comprises a plurality of food component nozzles for dispensing different food components from the food component sources in the container; and the delivery device is configured for selectively activating and deactivating the flow from the food component nozzles for dispensing a selected combination of one or more of the food components in the container depending on the type of beverage product selected for dispensing.

25. The dispenser of claim 1, further comprising a thermal exchange unit configured for heating or cooling the diluent to be dispensed.

* * * * *